Dec. 30, 1941. H. H. HELMERS 2,268,252
GARDEN CULTIVATOR
Filed April 12, 1940
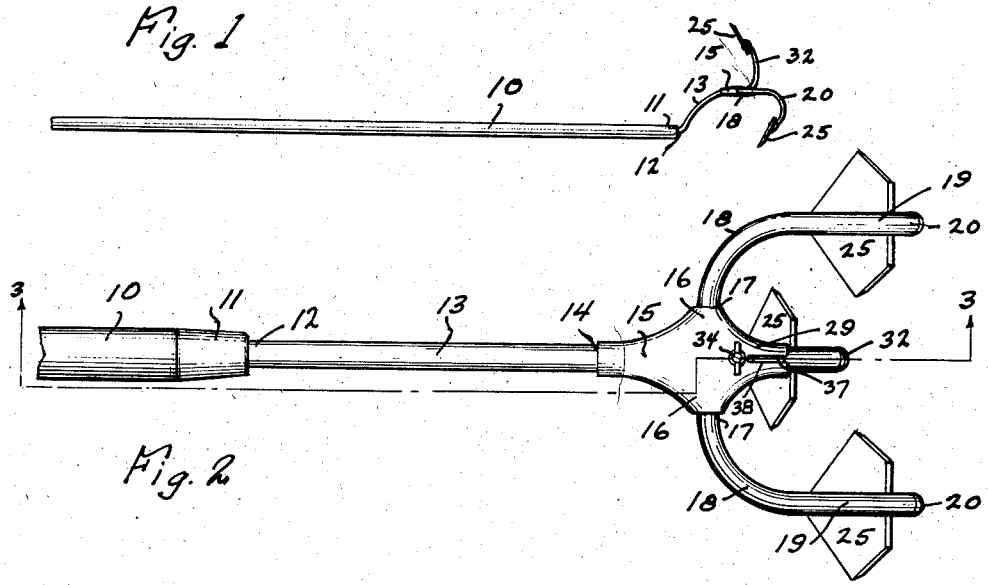
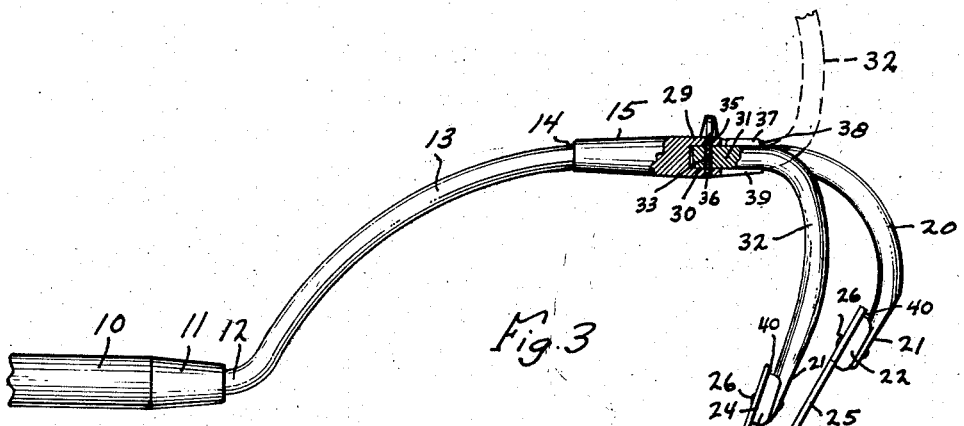
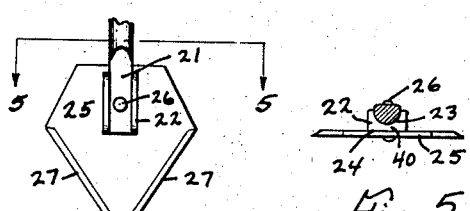
INVENTOR.
Henry H. Helmers
Sam J. Slotsky
BY ATTORNEY.

Patented Dec. 30, 1941

2,268,252

UNITED STATES PATENT OFFICE 2,268,252

GARDEN CULTIVATOR

Henry H. Helmers, Doon, Iowa

Application April 12, 1940, Serial No. 329,352

1 Claim. (Cl. 97—63)

My invention relates to a garden cultivating tool.

An object of my invention is to provide an efficient cultivating device which can be employed for ordinary cultivating purposes.

A further object of my invention is to provide a tool of this character which can be used for a double purpose; namely that of first forming a furrow, and then after seeding, to cover the seed or furrow with the same tool.

A further object of my invention is to provide a device of this character which can be adjustably arranged to provide the above mentioned effects.

A further object of my invention is to provide a tool of this character which will not allow the accumulation of dirt on the blades or cultivating portions of the device.

A further object of my invention is to provide the above mentioned objects in a simple construction which can be manufactured at a reasonable cost.

With these and other objects in view, my invention consists in the construction, arrangement, and combination of the various parts of my device, whereby the objects contemplated are attained, as hereinafter more fully set forth, pointed out in my claim, and illustrated in the accompanying drawing, in which:

Figure 1 is a side elevation of the cultivator,

Figure 2 is an enlarged plan view,

Figure 3 is a view taken substantially along the lines 3—3 of Figure 2,

Figure 4 is a detail, and

Figure 5 is a further detail of Figure 4 taken along the lines 5—5.

I have used the character 10 to designate a handle of the device which is any suitable lengthened rod preferably made of wood which terminates in a ferrule 11. Inserted in the ferrule 11 is an end 12 of the tool which extends into the upwardly bent arcuate portion 13 which portion 13 passes within and is securely welded or otherwise attached at 14 to a member 15. The member 15 includes a transverse portion 16 which receives at 17 arcuate tines 18 which tines extend into portions 19 and downwardly projecting arcuate portions 20. The portions 20 terminate in flattened extremities 21 which are received within keepers 22 which include arcuate lengthened openings 23 adapted to fit the contour of the members 20.

The arcuate portion 23 is at a slight distance from the lower edge of the member 22, and attached along the lower face 24 of the member 22 is a blade 25 which is attached by means of a rivet 26. The blade 25 includes angularly inclined bevelled edges 27 which terminate in a point 28. The member 15 extends into a forward portion 29 which includes a cylindrical opening 30 into which is received the end portion 31 of a further central tine 32.

The portion 31 includes a threaded opening 33 into which is threadably engaged a wing bolt 34 which passes through suitable openings at 35 and 36 as desired, which openings are also threaded. The portion 31 of the tine 32 also includes a raised flange 37 formed integrally therewith which is adapted to be received within slots 38 and 39 which are cut or otherwise formed in the upper and lower portions respectively of the forwardly extending portion 29.

The tine 32 extends downwardly into a similar construction as the other tines with the exception, however, that the lower end is positioned substantially lower and a similar blade 25 is attached thereto, the lower edges of which will project substantially downwardly at a lower level. It will also be noted that the tine 32 is in offset relation with respect to the tines 20. The cultivator is used in the following manner:

When used simply as a cultivator, the three tines will point downwardly as shown in Figures 2 and 3 and all three blades will engage the soil. However, for planting purposes, the tine 32 can be removed from the opening 30 by loosening the wing nut 34 and the tine can then be swung around to the position as shown by the dotted portion in Fig. 3 or as shown in Fig. 1.

The wing bolt 34 can then be placed through the lower opening 36, thereby resecuring the tine in the upper position. In either position, the upwardly extending flange 37 will be engaged within either the slot 38 or 39 so that the tine will be secured against rotative movement. When used in a position as shown in Fig. 1, first the single central tine which is attached to the central blade 25 is employed and the tool is drawn through the ground with the blade forming a single furrow. After the seeds are placed in the furrow, the tool is swung around to the position as shown in Fig. 1 and the outer blades 25 are drawn along through the ground at each side of the furrow which carries the dirt over the seeds and covers the furrow. In this manner, the tool provides a dual purpose of forming the furrow and covering without the necessity of using extra tools, and for ordinary cultivating purposes the tine can be swung around as explained.

It will be noted principally from Figures 3 and 5 that a small space 40 is left between the lower end of the tine and the blade 25. This prevents the accumulation of moist earth along the blade which would tend to gather in the event that the end 21 of the tine were close to the blade, since a portion of such earth would adhere to the tine itself and cause gathering of more earth to the surface.

By virtue of the space, however, the earth is allowed to break away so that the blade is left clean.

It will now be seen that I have provided a cultivating device which can be used for the double purpose of first forming a furrow and then covering the same, which can be adjusted for this purpose and then reversed to supply the ordinary cultivating features, which prevents accumulation of dirt, etc., on the blades, and which can be manufactured in a simple construction.

Some changes may be made in the construction and arrangement of the parts of my invention without departing from the real spirit and purpose of my invention, and it is my intention to cover by my claim any modified forms of structure or use of mechanical equivalents which may be reasonably included within its scope.

I claim as my invention:

A garden cultivator comprising a pair of outer tines including ground engaging blades attached thereto, a central tine including a ground engaging blade attached thereto, means for allowing reversing of said central tine from a downward to an upward position to provide means for operating the central tine independently of the outer tines, including a central member to which all of said tines are attached, said central member having a forward opening, said central tine having an integral inwardly projecting portion received within said opening, and said central tine normally being in offset position with respect to said outer tine, means for locking said central tine in fixed position including a wing bolt attached to said central member engaging said central tine, said central member having longitudinal slots adjacent said opening, said central tine including projecting portions received therein.

HENRY H. HELMERS.